United States Patent [19]

Adams

[11] 3,995,651
[45] Dec. 7, 1976

[54] VALVE FOR SHUTTING OFF GAS FLOW IN PIPES DURING EARTHQUAKES

[75] Inventor: Nellis C. Adams, La Canada, Calif.

[73] Assignee: The Raymond Lee Organization, Inc., a part interest

[22] Filed: July 21, 1975

[21] Appl. No.: 597,542

[52] U.S. Cl. .................................. 137/38; 251/68
[51] Int. Cl.² ...................................... F16K 17/36
[58] Field of Search .................. 137/38, 39; 251/68

[56] References Cited
UNITED STATES PATENTS

| | | | |
|---|---|---|---|
| 2,333,370 | 11/1943 | Graham | 251/68 X |
| 2,615,461 | 10/1952 | Crow | 137/39 |
| 2,875,617 | 3/1959 | Murphy | 251/68 X |
| 3,314,411 | 4/1967 | Power | 137/38 X |
| 3,779,262 | 12/1973 | Manning | 137/38 |

*Primary Examiner*—Robert G. Nilson

[57] ABSTRACT

An outlet pipe passes through the wall of an inlet pipe and communicates therewith. At the intersection of the two pipes, a flat valve seat is formed. A spring-loaded valve presses down against the valve seat to isolate the two pipes when unlocked, leaving the seat unobstructed and the pipes in communication when in a locked position. A catch normally supports the valve against the pressure of the spring, but pivots out of the way to allow the valve to close against the seat, in response to an electrical signal obtained from a battery placed in series with a mercury switch. A solenoid, actuated by the closing of the switch, moves the catch to its unlocked position.

3 Claims, 2 Drawing Figures

VALVE FOR SHUTTING OFF GAS FLOW IN PIPES DURING EARTHQUAKES

SUMMARY OF THE INVENTION

This invention is directed toward apparatus for cutting off the flow of gas through hollow pipes in response to an electrical signal initiated by an earthquake or other vibration.

In this invention, a spring-loaded valve when closed isolates two hollow pipes from each other and, when open, maintains the pipes in communication. The valve is normally locked in the open position by a catch. However, the catch opens in response to an electrical signal initiated by the vibration of an earthquake, whereby the valve closes, preventing the escape of gas through pipes fractured by the earthquake. The valve may be manually reset after the danger has passed.

This invention is not restricted to gas lines alone, but is applicable wherever a vibration-actuated valve is needed. An earthquake is, of course, only one form of vibration, and this valve will respond to other types of vibration if desired.

DETAILED DESCRIPTION OF PREFERRED EMBODIMENTS

Figure 1:
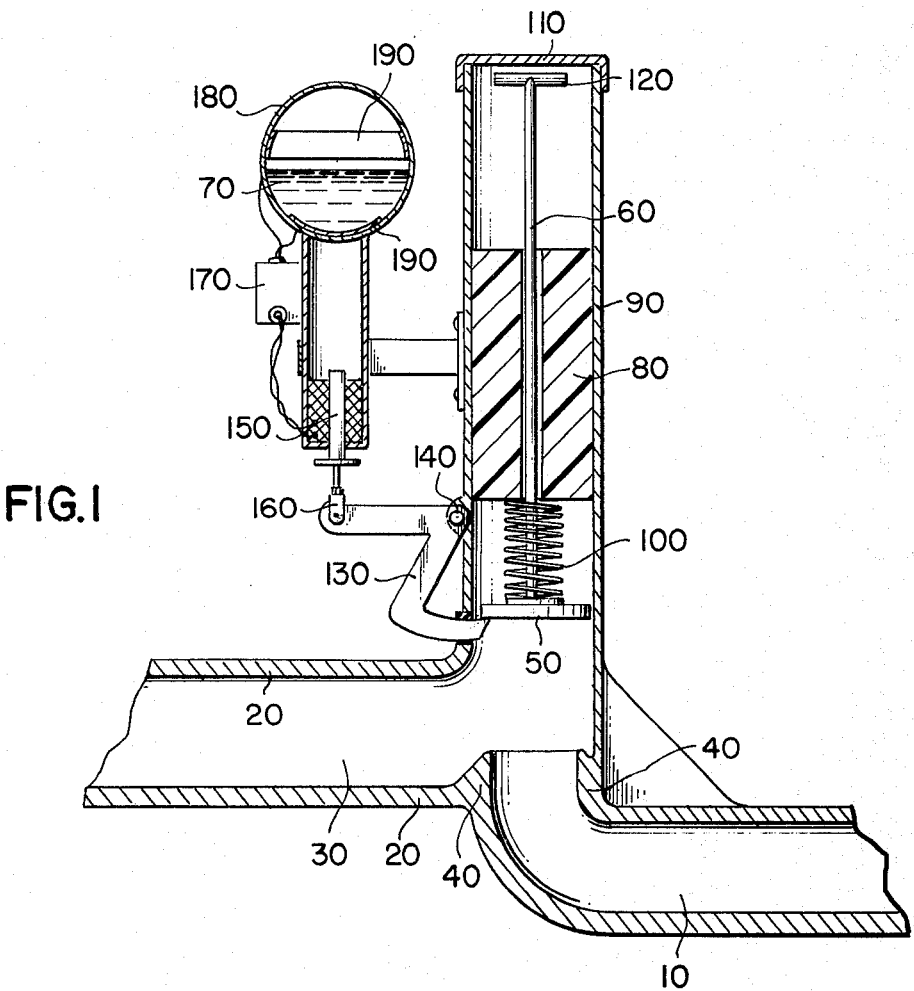
FIG. 1 shows a side cross-sectional view of the mechanical portion of the invention.
Figure 2:
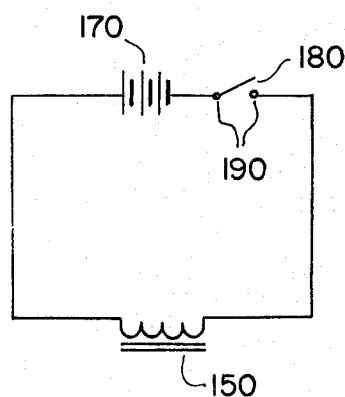
FIG. 2 shows the electrical diagram of a portion of the invention.

Referring now to FIGS. 1 and 2, a hollow gas outlet pipe 10 passes through the wall 20 of hollow gas inlet pipe 30. At the point 40 of intersection of the pipes, the wall 20 is built up to form a flat, circular valve seat.

Suspended directly above the seat is a flat circular valve disc 50. To the center of the disc is attached an elongated rod 60 that forms a valve stem and extends away at right angles to the disc. The stem slides up and down in the axial bore of a cylindrical valve guide 80 that is itself supported by hollow cylindrical tube 90. This tube is attached to the pipes and keeps the valve properly aligned. A compression spring 100, placed between the disc and the guide, urges the valve towards the seat.

It can be seen that when the disc presses against the seat, the two pipes will be kept isolated from each other. After the valve has thus been allowed to close, it can be re-opened by removing cap 110 from the top of tube 90 and pulling up on the crosspiece 120 that is attached to the top of the valve stem.

To keep the valve from closing under the influence of spring 100, a catch 130 supports it against the pressure of spring 100. The catch is generally Z-shaped, and pivoted at 140, the top vertex of the Z. When the catch is pivoted clockwise by solenoid 150 mounted on the tube and attached to the catch via linkage 160, the catch is thus removed from underneath the valve, allowing the valve to close.

The solenoid is energized by battery 170, that is placed in series with conventional mercury switch 180 and also in series with the solenoid. The mercury switch is mounted directly above the solenoid and is a hollow sphere about half full of mercury 70, that closes a circuit when the switch is vibrated sufficiently violently as to cause the mercury to bridge contacts 190 located on the interior of the sphere. Thus, when an earthquake occurs, the switch is shaken, the solenoid is energized, the catch is rotated, the valve is unlocked and the input and output pipes are isolated.

To reset the device, the valve is pulled up as described above and the catch is pushed underneath the disc again. The device is then ready to be triggered by a subsequent earthquake or other suitable vibration.

Although the invention has been described with particular reference to the drawings, the protection sought is to be limited only by the terms of the claims which follow.

What is claimed is:

1. A valve for shutting off the flow of gas in pipes in response to vibrations comprising:
    a hollow gas outlet pipe;
    a hollow gas inlet pipe communicating with the outlet pipe, the outlet pipe entering the inlet pipe through the wall of the inlet pipe with the intersection of the pipes forming a flat valve seat;
    a spring-loaded valve that leaves the valve seat unobstructed when locked and that covers the valve seat and thereby isolates the outlet pipe from the inlet pipe when unlocked;
    catch means for locking and unlocking the valve, the catch means normally keeping the valve locked and unlocking it in response to an electrical signal; and
    switch means for supplying said signal to said means, said signal being produced when said vibrations are produced, said switch means including a normally open mercury switch placed in series with a battery.

2. The device of claim 1, wherein the valve includes a flat circular disc, an elongated rod attached to the center of the disc and extending away therefrom at right angles and a short crosspiece attached to the end of the rod remote from the disc, the crosspiece serving as a handle to raise the valve from its unlocked position to its locked position.

3. The device of claim 2 wherein the catch means includes a spring urging the valve towards the valve seat and a movable catch normally supporting the valve against the pressure of the spring, whereby the valve is locked when the catch is supporting the valve and the valve is unlocked when the valve is not supported by the catch, allowing the valve to be pressed against the valve seat by the spring.

* * * * *